United States Patent
Gaben (10) Patent No.: US 10,804,569 B2
(45) Date of Patent: Oct. 13, 2020

(54) SOLID-STATE BATTERY INCLUDING AN ELECTROLYTE MADE OF A CROSS-LINKED SOLID POLYMER MATERIAL

(71) Applicant: I-TEN, Champagne-su-Mont-d'Or (FR)

(72) Inventor: Fabien Gaben, Dardilly (FR)

(73) Assignee: I-TEN, Dardilly (FR)

( * ) Notice: Subject to any disclaimer, the term of this patent is extended or adjusted under 35 U.S.C. 154(b) by 237 days.

(21) Appl. No.: 15/323,727

(22) PCT Filed: Jul. 1, 2015

(86) PCT No.: PCT/FR2015/051814
§ 371 (c)(1),
(2) Date: Jan. 3, 2017

(87) PCT Pub. No.: WO2016/001584
PCT Pub. Date: Jan. 7, 2016

(65) Prior Publication Data
US 2017/0162911 A1    Jun. 8, 2017

(30) Foreign Application Priority Data

Jul. 1, 2014 (FR) .................... 14 56273

(51) Int. Cl.
*H01M 10/0585* (2010.01)
*H01M 10/0565* (2010.01)
*H01M 10/0525* (2010.01)
*H01M 10/052* (2010.01)

(52) U.S. Cl.
CPC ..... *H01M 10/0585* (2013.01); *H01M 10/052* (2013.01); *H01M 10/0525* (2013.01); *H01M 10/0565* (2013.01); H01M 2300/0082 (2013.01)

(58) Field of Classification Search
CPC ........ H01M 10/0525; H01M 10/0565; H01M 10/0585; H01M 2300/0082
See application file for complete search history.

(56) References Cited

U.S. PATENT DOCUMENTS

| | | | | |
|---|---|---|---|---|
| 6,664,006 | B1* | 12/2003 | Munshi | H01M 4/13 429/623.1 |
| 2004/0166417 | A1* | 8/2004 | Nishio | C08G 65/14 429/317 |
| 2004/0209163 | A1* | 10/2004 | Watanabe | H01M 2/30 429/178 |
| 2007/0015061 | A1 | 1/2007 | Klaassen | |
| 2008/0290022 | A1* | 11/2008 | Sanchez | B01D 67/0006 210/500.33 |
| 2009/0202899 | A1* | 8/2009 | Pyszczek | H01M 6/06 429/152 |
| 2014/0308576 | A1* | 10/2014 | Gaben | C25D 13/02 429/185 |
| 2014/0370365 | A1* | 12/2014 | Kubota | H01M 2/1072 429/156 |

FOREIGN PATENT DOCUMENTS

| | | |
|---|---|---|
| EP | 2432065 A1 | 3/2012 |
| FR | 2893623 A1 | 5/2007 |
| FR | 2982083 A1 | 5/2013 |
| WO | 2013064779 A1 | 5/2013 |
| WO | WO-2013064779 A1 * | 5/2013 ............. C25D 13/02 |

\* cited by examiner

*Primary Examiner* — Carlos Barcena
(74) *Attorney, Agent, or Firm* — Jordan IP Law, LLC; Todd A. Vaughn (57) ABSTRACT

An all-solid battery including a solid electrolyte made of a cross-linked polymer material, and which has good mechanical resistance and superior ionic conductivity.

17 Claims, 2 Drawing Sheets

SOLID-STATE BATTERY INCLUDING AN ELECTROLYTE MADE OF A CROSS-LINKED SOLID POLYMER MATERIAL

CROSS-REFERENCE TO RELATED APPLICATIONS

The present application is a National Stage Application of PCT International Application No. PCT/FR2015/051814 (filed on Jul. 1, 2015), under 35 U.S.C. § 371, which claims priority to French Patent Application No. 1456273 (filed on Jul. 1, 2014), which are each hereby incorporated by reference in their respective entireties.

TECHNICAL FIELD

This invention relates to the field of batteries and in particular lithium-ion batteries. It relates more specifically to all-solid lithium ion batteries ("Li-ion batteries") and a novel process for producing such batteries.

BACKGROUND

Batteries including electrolytes formed either by a salt dissolved in a dry polymer or by a polymer swollen or gelled by a solution of a salt in a mixture of organic aprotic polar solvents are known. Typically, the production of the electrolyte consists in placing a polymer, a salt and a mixture of solvents forming the polymer electrolyte in solution, then, after having deposited the mixture in the form of a film, the solvent is removed under atmospheric or reduced pressure without removing the solvents forming the polymer electrolyte. Document WO 98/35 397 A1 describes a battery including an electrolyte formed by a dried electrolyte solution including a thermoplastic polyimide that is amorphous and soluble in an organic solvent, and a lithium salt. However, the use of organic solvent does not make it possible to guarantee the safety and lifetime of the battery by protecting it from risks of short circuit and ignition of solvent.

All-solid batteries including solid electrolytes produced from polymer material based on polyethylene oxide (PEO) or polypropylene oxide (PPO) are also known. However, these types of electrolytes have a relatively low ionic conductivity at ambient temperature (approximately 10-7 S/cm). Document U.S. Pat. No. 5,407,593 teaches that the transport of ions in a polymer electrolyte passes through the amorphous region of a polymer matrix. Thus, the ionic conductivity of a polymer electrolyte may be increased by reducing the crystalline region and by increasing the amorphous region of the polymer. In addition, it is possible by modifying the glass transition temperature of the polymer, by removing the crystalline zones and by using lower molecular masses, to increase ionic conduction. However, these modifications to the polymer material often create significant degradation of the mechanical properties of the electrolyte.

In addition, it has been demonstrated that cross-linking of the conductive polymer may increase the solidity of the films, but this results in a reduction in conductivity. For example, the article of P. M. Blonsky and D. F. Shriver, J. Am. Chem. Soc. 1984, 106, pages 6854-6855 describes a polymer of the poly(bis(methoxy ethoxy)phosphazene) type including short chains of polyethylene oxide of which the ionic conductivity at 25° C. exceeds 10-5 S/cm. However, the electrochemical stability of the cross-linked solid polymer material as well as its mechanical properties are limited.

SUMMARY

The present invention is intended to produce an all-solid battery including a solid electrolyte made of a cross-linked polymer material, having good mechanical resistance and having an ionic conductivity superior to that of solid electrolytes made of a cross-linked polymer material known from the prior art.

Another objective of the invention is to produce thin-layer batteries by a process capable of being implemented at an industrial level in a relatively simple manner.

A first object of the invention concerns a process for producing an all-solid thin-layer battery including the following series of steps:

a) a layer including at least one anode material (referred to here as "anode material layer") is deposited on its conductive substrate, preferably selected from the group formed by a metal sheet, a metal strip, a metallized insulating sheet, a metallized insulating strip, a metallized insulating film, said conductive substrates, or conductive elements thereof, capable of serving as an anode current collector;

b) a layer including at least one cathode material (referred to here as "cathode material layer") is deposited on its conductive substrate, preferably selected from the group formed by a metal sheet, a metal strip, a metallized insulating sheet, a metallized insulating strip, a metallized insulating film, said conductive substrates, or conductive elements thereof, capable of serving as a cathode current collector, with the understanding that steps a) and b) can be reversed;

c) on at least one layer obtained in step a) and/or b), a layer including at least one solid electrolyte material having a thickness of less than 10 μm, preferably less than 5 μm and even more preferably less than 2 μm (referred to here as "electrolyte material layer") is deposited, the solid electrolyte material including a cross-linked solid polymer material comprising ionic groups;

d) the following are stacked face to face:
an anode material layer coated with a solid electrolyte material layer obtained in step c) with a cathode material layer coated or not with a solid electrolyte material layer obtained in step c);
or a cathode material layer coated with a solid electrolyte material layer obtained in step c) with an anode material layer coated or not with a solid electrolyte material layer obtained in step c);

e) a heat treatment and/or a mechanical compression of the stack obtained in step d) is performed in order to obtain an all-solid thin-layer battery.

Preferably, the solid cross-linked polymer material is chosen from polymethyl methacrylates, polyamines, polyimides or polysiloxanes.

Preferably, the ionic groups of the polymer material are chosen from the following cations: imidazolium, pyrazolium, tetrazolium, pyridinium, pyrrolidinium, such as n-propyl-n-methylpyrrolidinium (also called PYR13) or n-butyl-n-methylpyrrolidinium (also called PYR14), ammonium, phosphonium or sulfonium; and/or from the following anions: bis(trifluoromethane)sulfonimide, bis(fluorosulfonyl)imide, or n-(nonafluorobutane-sulfonyl)-n-(trifluoromethanesulfonyl)-imide.

In a particular embodiment of the process according to the invention, the solid cross-linked polymer material is obtained by a step of polymerization of a mixture of monomers and/or oligomers and/or pre-polymers including one or more thermally or photochemically polymerizable groups, said mixture of monomers and/or oligomers and/or prepolymers including one or more reactive groups enabling said ionic groups to be grafted, then drying of the cross-linked polymer material obtained.

Advantageously, the thermal and/or photochemical polymerization is performed directly on the anode and/or cathode layer(s).

The cross-linked polymer material comprising ionic groups deposited in step c) is performed by at least one of the following techniques: dip-coating, spin-coating, roll coating, doctor blade, electrospraying or electrophoresis.

The thickness of the electrolyte layer c) is less than 10 µm, preferably less than 5 µm and even more preferably less than 2 µm. Advantageously, the thickness of the polymer material layer is between 0.5 and 1 µm.

The solid anode, cathode and electrolyte layers are deposited using at least one of the following techniques:

(i) physical vapor deposition (PVD), and more specifically by vacuum evaporation, laser ablation, ion beam, or cathode sputtering;

(ii) chemical vapor deposition (CVD), and more specifically plasma-enhanced chemical vapor deposition (PECVD), laser-assisted chemical vapor deposition (LACVD), or aerosol-assisted chemical vapor deposition (AA-CVD);

(iii) electrospraying;

(iv) electrophoresis;

(v) aerosol deposition;

(vi) sol-gel;

(vii) dipping, more specifically dip-coating, spin-coating or the Langmuir-Blodgett process.

Preferably, the anode, cathode and electrolyte layers are deposited by electrospraying, electrophoresis, using an aerosol, or by dipping, and are preferably all deposited by electrophoresis.

Advantageously, the layers of anode and/or cathode material also include electrically conductive materials, and in particular graphite, and/or lithium ion conductive materials, of the type used to produce electrolyte films.

In a preferred embodiment, the anode and/or cathode and/or electrolyte layers are produced by a deposition of nanoparticles, respectively, of anode, cathode or electrolyte material using at least one of the following techniques: electrospraying, electrophoresis, aerosol deposition, and dipping.

Preferably, the layers of anode, cathode and electrolyte material are all deposited by electrophoresis.

Advantageously, the heat treatment is performed at a temperature of between 50° C. and 100° C., preferably between 100° C. and 200° C., and/or the mechanical compression of the layers to be assembled is performed at a pressure of between 10 and 100 MPa, and preferably between 20 and 50 MPa.

The anode material layer a) is produced from a material chosen from:

(i) tin oxynitrides (typical formula SnOxNy);

(ii) lithiated iron phosphate (typical formula LiFePO$_4$);

(iii) mixed silicon and tin oxynitrides (typical formula Si$_a$Sn$_b$O$_y$N$_z$ with a>0, b>0, a+b≤2, 0<y≤4, 0<z≤3) (also called SiTON), and in particular SiSn$_{0.87}$O$_{1.2}$N$_{1.72}$; as well as oxynitrides-carbides with the typical form Si$_a$Sn$_b$C$_c$O$_y$N$_z$ with a>0, b>0, a+b≤2, 0<c<10, 0<y<24, 0<z<17; Si$_a$Sn$_b$C$_c$O$_y$N$_z$X$_n$ with X$_n$ comprising at least one of the elements among F, Cl, Br, I, S, Se, Te, P, As, Sb, Bi, Ge, Pb and a>0, b>0, a+b>0, a+b≤2, 0<c<10, 0<y<24 and 0<z<17; and Si$_a$Sn$_b$O$_y$N$_z$X$_n$ with X$_n$ comprising at least one of the elements among F, Cl, Br, I, S, Se, Te, P, As, Sb, Bi, Ge, Pb and a>0, b>0, a+b≤2, 0<y≤4 and 0<z≤3;

(iv) nitrides of type Si$_x$N$_y$ (in particular with x=3 and y=4), Sn$_x$N$_y$ (in particular with x=3 and y=4), Zn$_x$N$_y$ (in particular with x=3 and y=4), Li$_{3-x}$M$_x$N (with M=Co, Ni, Cu);

(v) the oxides SnO$_2$, Li$_4$Ti$_5$O$_{12}$, SnB$_{0.6}$P$_{0.4}$O$_{2.9}$ and TiO$_2$.

The cathode material layer b) is produced from cathode material chosen from:

(i) the oxides LiMn$_2$O$_4$, LiCoO$_2$, LiNiO$_2$, LiMn$_{1.5}$Ni$_{0.5}$O$_4$, LiMn$_{1.5}$Ni$_{0.5-x}$X$_x$O$_4$ (in which x is selected from Al, Fe, Cr, Co, Rh, Nd, other rare earth elements, and in which 0<x<0.1), LiFeO$_2$, LiMn$_{1/3}$Ni$_{1/3}$Co$_{1/3}$O$_4$;

(ii) the phosphates LiFePO$_4$, LiMnPO$_4$, LiCoPO$_4$, LiNiPO$_4$, Li$_3$V$_2$(PO$_4$)$_3$; and the phosphates of formula LiMM'PO$_4$, with M and M' (M≠M') selected from Fe, Mn, Ni, Co, V;

(iii) all lithiated forms of the following chalcogenides: V$_2$O$_5$, V$_3$O$_8$, TiS$_2$, titanium oxysulfides (TiO$_y$S$_z$), tungsten oxysulfides (WO$_y$S$_z$), CuS, and CuS$_2$.

In a particular embodiment, the process also includes a step f) of encapsulating the battery obtained in step e) by deposition of at least one ceramic, vitreous or vitroceramic material encapsulation layer.

Advantageously, anode and cathode terminals are produced by metallization of the sections cut, preferably by deposition of a tin layer, optionally deposited on a sub-layer of nickel and/or epoxy resin filled with metal particles.

Preferably, the conductive substrates are made of aluminum, copper, stainless steel, titanium or nickel, preferably nickel, and optionally coated with a noble metal chosen from the following metals: gold, platinum, palladium, vanadium, cobalt, nickel, manganese, niobium, tantalum, chromium, molybdenum, titanium, palladium, zirconium, tungsten or any alloy containing at least one of these metals.

Another object of the invention concerns a battery capable of being obtained by the process according to the invention.

Advantageously, the surface capacity of the cathode is greater than or equal to the surface capacity of the anode.

In a preferred embodiment, the stack of cathode and anode layers is laterally offset.

Advantageously, the battery includes at least one encapsulation layer, preferably a ceramic, glass or vitroceramic layer. Even more advantageously, the battery includes a second encapsulation layer deposited on said first encapsulation layer, said second encapsulation layer preferably being silicone.

Preferably, said at least one encapsulation layer entirely covers four of the six faces of said battery and partially covers the two remaining faces, located below the metallizations intended for the connections of the battery.

In a particular embodiment, the battery includes terminals where the cathode and anode current collectors, respectively, are exposed.

Advantageously, the anode connections and the cathode connections are located on opposite sides of the stack.

According to a particular aspect of the invention, the battery is entirely inorganic.

DESCRIPTION

In the context of the present invention, "electrophoretic deposition" or "deposition by electrophoresis" refers to a layer deposited by a process of depositing particles previously suspended in a liquid medium, onto a preferably conductive substrate, the displacement of the particles to the surface of the substrate being generated by application of an electric field between two electrodes placed in the suspension, one of the electrodes constituting the conductive substrate on which the deposition is performed, and the other electrode ("counter electrode") being placed in the liquid phase. A so-called "dense" deposition of particles forms on the substrate, if the zeta potential of the particle suspension has an appropriate value, and/or after a specific thermal and/or mechanical densification treatment. This deposition has a particular structure recognizable to a person skilled in the art, who can distinguish it from depositions obtained by any other technique.

In the context of the present document, the size of a particle is its largest dimension. Thus, a "nanoparticle" is a particle of which at least one of the dimensions is less than 100 nm. The "particle size" or "mean particle size" of a powder or a group of particles is given as D50.

An "all-solid" battery is a battery not containing liquid phase material.

The "surface capacity" of an electrode refers to the quantity of lithium ion capable of being inserted into an electrode (expressed as mA·h/cm$^2$):

In the context of the present invention, garnet-type compounds may be used, in particular as the electrolyte, in which the ionic conductivity is ensure by lithium ions. The chemical composition of garnets is variable according to the isomorphic substitution of the different atoms constituting its basic formula $Li_d A1_x A2_y (TO_4)_z$. In this formula, Li represents a lithium cation. The value d is between 2 and 10, preferably between 3 and 9, and even more preferably between 4 and 8. A1 represents a cation of oxidation number +II, at the pseudocubic coordination site 8. The value x is typically 3, but it may have a stoichiometric deviation. A1 may for example be Ca, Mg, Sr, Ba, Fe, Mn, Zn, Y, Gd. A2 represents a cation of oxidation number +III, at the octahedral coordination site 6. The value y is typically 2, but there may be a stoichiometric deviation. A2 may for example be Al, Fe, Cr, Ga, Ti, La. A1 and A2 may represent the same cation. $TO_4$ represents an anion in which the four oxygen atoms form a tetrahedron, the cation T being at the center of the tetrahedron; T represents primarily a cation of oxidation number +IV, and primarily silicon. In this last case, $TO_4$ represents the silicate anion $(SiO_4)_4$— and these garnets are then considered to be nesosilicates, the structure of which may be described by a three-dimensional network formed by SiO4 $SiO_4$ tetrahedra connected by the apex to octahedra $A2O_6$. The cavities formed have a distorted cube shape $A1O_8$ (dodecahedra). Each tetrahedron shares its apexes with four different octahedral. Each octahedral is bound at the apex to six different tetrahedral and at the edge to six dodecahedra. Each dodecahedra shares its edges with four other dodecahedra, four octahedral and two tetrahedral. Only two of its edges are not shared. T may also be the cation $Zr_{4+}$. All or some of the elements T with an oxidation number +IV may be replaced by atoms with an oxidation number +III or +V, such as: Al, Fe, As, V, Nb, In, Ta, Zr; this may cause an adjustment in the molar amount of oxygen in the formula $Li_d A1_x A2_y (TO_4)_z$. In this formula, the atoms A1, A2, T and O may be subject to isomorphic substitution. This isomorphic substitution may be of different types, and primarily two types: the same number of atoms may be replaced by the same number of different atoms of the same valence (so-called first-species isomorphisms), an atom may be replaced by another atom with a similar ionic radius and a valence that differs by one unit (so-called second-species isomorphism, by so-called aliovalent substitution); in this second case, the electrical neutrality is ensured either by a corresponding replacement in the crystallographic network, or by a vacancy, or by a mobile interstitial ion (anion or cation); this mobile interstitial ion may be lithium. In the formula indicated above, the number z is normally equal to 3 or close to 3. A small part of the oxygen atoms may optionally be bound to a hydrogen atom (OH group rather than O). A small portion of the groups (TO4) may also be replaced by OH groups; in this case, it $(TO_4)_{3-p}(OH)_{4p}$ should be written instead of $(TO_4)_3$. The oxygen may be replaced at least partially by bivalent or trivalent anions (such as $N_3$—).

Garnet-based ionic conductors with mobile lithium ions are described, for example, in documents WO 2005/085138, WO 2009/003695 and WO 2010/090301. The lithium ions occupy crystallographic sites and may also be in the interstitial position.

In the context of the present invention, the garnet-type compounds are, preferably, chosen from:

$Li_7 La_3 Zr_2 O_{12}$;

$Li_6 La_3 BaTa_2 O_{12}$;

$Li_{5.5} La_3 Nb_{1.75} In_{0.25} O_{12}$;

$Li_5 La_3 M_2 O_{12}$ with M=Nb or Ta or a mixture of the two compounds;

$Li_{7-x} Ba_x La_{3-x} M_2 O_{12}$ with 0≤x≤1 and M=Nb or Ta or a mixture of the two compounds; and $Li_{7-x} La_3 Zr_{2-x} M_x O_{12}$ with 0≤x≤2 and M=Al, Ga or Ta or a mixture of two or three of said compounds;

To respond to the above-mentioned disadvantages, the inventor has developed a new process for producing an all-solid battery, not containing organic solvents so that they can be heated without the risk of combustion. The objectives are achieved by the implementation of a process for producing a thin-layer battery including at least one layer of a cross-linked polymer material comprising ionic groups. The batteries obtained by the process according to the invention have a multilayer structure, by contrast with planar structures of the conventional thin-layer batteries, in order to obtain batteries having good energy and power density. In addition, the process for obtaining these batteries makes it possible to produce an assembly of battery layers at a relatively low temperature, i.e. at a temperature below 300° C., without reducing the surface capacities of the electrodes constituting the resulting battery. The production of an "all-solid" battery requires the use of dimensionally stable materials, in order to make the behavior of the battery reliable, in particular with regard to limiting deformation constraints on the encapsulation or on the electrodes.

The solid anode, cathode and electrolyte layers are deposited using one of the following techniques:

i) physical vapor deposition (PVD), and more specifically vacuum evaporation, laser ablation, ion beam, cathode sputtering;

ii) chemical vapor deposition (CVD), and more specifically plasma-enhanced chemical vapor deposition (PECVD), laser-assisted chemical vapor deposition (LACVD), or aerosol-assisted chemical vapor deposition (AA-CVD);

iii) electrospraying;

iv) electrophoresis;

v) aerosol deposition;

vi) sol-gel;

vii) dipping, more specifically dip-coating, spin-coating or the Langmuir-Blodgett process.

According to the invention, the anode and cathode layers are advantageously deposited by electrophoresis. The electrophoretic deposition of particles is performed by applying an electric field between the substrate on which the deposition is produced and a counter electrode, enabling the charged particles of the colloidal suspension to move and be deposited on the substrate. The absence of binders and other solvents deposited at the surface with the particles makes it possible to obtain very compact depositions. The compactness obtained owing to the electrophoretic deposition limits and even prevents the risks of cracks or the appearance of other defects in the deposition during the drying steps. In addition, the deposition rate may be very high owing to the electric field applied and the electrophoretic mobility of the particles of the suspension.

According to the invention, the process for producing an all-solid battery includes a step a) of deposition of an anode material layer. The materials chosen for the anode material layer are preferably chosen from the following materials:

i) tin oxynitrides (typical formula $SnO_xN_y$);

ii) lithiated iron phosphate (typical formula $LiFePO_4$);

iii) mixed silicon and tin oxynitrides (typical formula $Si_aSn_bO_yN_z$ with $a>0$, $b>0$, $a+b\leq2$, $0<y\leq4$, $0<z\leq3$) (also called SiTON), and in particular $SiSn_{0.87}O_{1.2}N_{1.72}$; as well as oxynitrides in the form $Si_aSn_bC_cO_yN_z$ with $a>0$, $b>0$, $a+b\leq2$, $0<c-10$, $0<y<24$, $0<z<17$; $Si_aSn_bC_cO_yN_zX_n$ with Xn at least one of the elements among F, Cl, Br, I, S, Se, Te, P, As, Sb, Bi, Ge, Pb and $a>0$, $b>0$, $a+b>0$, $a+b\leq2$, $0<c<10$, $0<y<24$ and $0<z<17$; and $Si_aSn_bO_yN_zX_n$ with $X_n$ at least one of the elements among F, Cl, Br, I, S, Se, Te, P, As, Sb, Bi, Ge, Pb and $a>0$, $b>0$, $a+b\leq2$, $0<y\leq4$ and $0<z\leq3$;

iv) nitrides of type $Si_xN_y$ (in particular with $x=3$ and $y=4$), $Sn_xN_y$ (in particular with $x=3$ and $y=4$), $Zn_xN_y$ (in particular with $x=3$ and $y=4$), $Li_{3-x}M_xN$ (with M=Co, Ni, Cu); and v) the oxides $SnO_2$, $Li_4Ti_5O_{12}$, $SnB_{0.6}P_{0.4}O_{2.9}$ and $TiO_2$. $Li_4T_5O_{12}$ for producing the anode layer is particularly preferred. In addition, $Li_4Ti_5O_{12}$ is a lithium insertion material reversibly inserting lithium ions without causing deformation of the host material.

According to the invention, the process for producing an all-solid battery includes a step b) of depositing a cathode material layer. The cathode material layer is preferably produced by electrophoresis. The materials chosen for the cathode material layer are preferably chosen from the following materials:

i) the oxides $LiMn_2O_4$, $LiCoO_2$, $LiNiO_2$, $LiMn_{1.5}Ni_{0.5}O_4$, $LiMn_{1.5}Ni_{0.5-x}X_xO_4$ (in which X is selected from Al, Fe, Cr, Co, Rh, Nd, other rare earth elements, and in which $0<x<0.1$), $LiFeO_2$, $LiMn_{1/3}Ni_{1/3}Co_{1/3}O_4$;

ii) the phosphates $LiFePO_4$, $LiMnPO_4$, $LiCoPO_4$, $LiNiPO_4$, $Li_3V_2(PO_4)_3$;

iii) all lithiated forms of the following chalcogenides: $V_2O_5$, $V_3O_8$, $TiS_2$, titanium oxysulfides ($TiO_yS_z$), tungsten oxysulfides ($WO_yS_z$), CuS, $CuS_2$.

Advantageously, the depositions of the anode and cathode material layer are performed by electrophoretic deposition of nanoparticles of anode and cathode material, respectively.

The cathode electrode, consisting of a thin layer of $LiMn_2O_4$ deposited on a metal substrate, preferably nickel, is advantageously produced without using vacuum techniques or dry rooms—equipment that is very expensive to implement. In fact, $LiMn_2O_4$, like $LiMn_{1.5}Ni_{0.5}O_4$, is not spontaneously sensitive to air. It is, however, recommended to avoid prolonged exposure. The impact of the exposures of cathode materials to air during production of the electrodes remains negligible with regard to the relatively short implementation times.

To produce the anode or cathode, it is possible to add to the above-cited nanoparticles of electrically conductive materials, and in particular graphite, and/or nanoparticles of ionic conductive materials, of the type used to produce electrolyte films (described below).

Advantageously, the depositions of the layer of anode and cathode material nanoparticles are performed directly on the metal substrate. For small nanoparticle sizes, i.e. less than 100 nm, the deposition of anode, cathode and electrolyte layers are performed by electrospraying, electrophoresis, aerosol deposition, or dipping. Advantageously, the anode, cathode and electrolyte layers are all deposited by electrophoresis. This particular embodiment of the process according to the invention makes it possible to obtain a dense and compact layer of nanoparticles, in particular by self-sintering of the nanoparticle layer during the step of electrophoretic deposition, drying and/or heat treatment at low temperature. In addition, as the electrophoretic deposition of the layer of anode or cathode material nanoparticles is compact, the risk of cracking of the layer after drying is reduced, unlike the nanoparticle layers produced from inks or fluids, having low dry extract contents and for which the deposits contain large quantities of solvent, which, after drying leads to the appearance of cracks in the deposit, which is detrimental to the operation of a battery.

According to the invention, the deposition of the layer of anode or cathode material nanoparticles is performed directly on its conductive substrate, preferably a metal conductive substrate chosen from the following materials: nickel, aluminum, stainless steel, titanium or copper. In a preferred embodiment, the deposition of the layer of anode or cathode material nanoparticles is performed on a nickel substrate. The thickness of the substrate is less than 10 μm, and preferably less than 5 μm.

The conductive substrates may be used in the form of sheets, optionally sheets including pre-cut electrode patterns or in the form of strips. To improve the quality of the electrical contacts with the electrodes, the substrates may advantageously be coated with a metal or a metal alloy, preferably chosen from gold, chromium, stainless steel, palladium, molybdenum, titanium, tantalum or silver.

According to the invention, the deposition of a layer of anode or cathode material nanoparticles directly onto its conductive substrate, for example, by electrophoresis, makes it possible to obtain a dense nanocrystalline structure layer. However, the formation of grain boundaries is possible, leading to the formation of a layer having a particular structure, between that of an amorphous and crystallized material, which may in certain cases limit the kinetics of diffusion of the lithium ions in the thickness of the electrode. Thus, the power of the battery electrode and the life cycle may be affected. Advantageously, to improve the performance of the battery, a recrystallization heat treatment is performed in order to improve the crystallinity, and the electrode is optionally consolidated in order to reinforce the power of the electrodes (anode and/or cathode).

The recrystallization heat treatment of the anode and/or cathode layer is performed at a temperature of between 300° C. and 1000° C., preferably between 400° C. and 800° C., and even more preferably between 500° C. and 700° C. The heat treatment must be performed after step a) and/or b) of deposition of the anode and/or cathode layer, but before step c) of deposition of the electrolyte layer.

According to the invention, the process for producing a battery includes a step c) of deposition of an electrolyte material layer. The deposition of the electrolyte material layer is performed on the anode material layer and/or on the cathode material layer.

Preferably, the cross-linked polymer material is chosen from any type of polymer containing the cationic groups described below. More specifically, the cross-linked polymer material is chosen from the polymethyl methacrylates, polyimides, polysiloxanes or polyamines, containing the cationic groups described below.

Preferably, the ionic groups of the polymer material are chosen from the following cations: imidazolium, pyrazolium, tetrazolium, pyridinium, pyrrolidinium, such as n-propyl-n-methylpyrrolidinium (also called PYR13) or n-butyl-n-methylpyrrolidinium (also called PYR14), ammonium, phosphonium or sulfonium; and/or from the following anions: bis(trifluoromethane)sulfonimide, bis(fluorosulfonyl)imide, or n-(nonafluorobutane-sulfonyl)-n-(trifluoromethanesulfonyl)-imide (of raw formula $C_5F_{12}NO_4S_2$, also called IM14-). The use of such anions makes it possible to preserve good properties of resistance to exposure to air and moisture, thereby simplifying the industrial implementation and guaranteeing better performance in terms of battery lifetime.

In addition, the layer of solid cross-linked polymer material comprising ionic groups makes it possible to ensure the safety and lifetime of the battery by protecting it from risks of short circuit and ignition of solvent. In fact, these polymer materials are all-solid and do not contain any liquid electrolyte or electrolyte dissolved in a solvent. Moreover, these cross-linked polymer materials resist high temperatures without the risk of evaporation or ignition of an organic solvent.

The electrolyte material layer c) is produced from a solid electrolyte material including a solid cross-linked polymer comprising ionic groups; the solid electrolyte material may be chosen from:

garnets of the formula $LidA1_xA2_y(TO_4)_z$ wherein:

A1 represents a cation of oxidation number +II, preferably Ca, Mg, Sr, Ba, Fe, Mn, Zn, Y, Gd; and wherein A2 represents a cation of oxidation number +III, preferably Al, Fe, Cr, Ga, Ti, La; and wherein $(TO_4)$ represents an anion in which T is an atom of oxidation number +IV, located at the center of a tetrahedron formed by oxygen atoms, and in which $TO_4$ advantageously represents the silicate or zirconate anion, with the understanding that all or some of the elements T with an oxidation number +IV may be replaced by atoms with an oxidation number +III or +V, such as Al, Fe, As, V, Nb, In, Ta;

with the understanding that: d is between 2 and 10, preferably between 3 and 9, and even more preferably between 4 and 8; x is 3 but may be between 2.6 and 3.4 (preferably between 2.8 and 3.2), and y is 2 but may be between 1.7 and 2.3 (preferably between 1.9 and 2.1);

the garments, preferably chosen from: $Li_7La_3Zr_2O_{12}$; $Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with 0≤x≤1 and M=Nb or Ta or a mixture of two compounds; $Li_{7-x}La_3Zr_{2-x}M_xO_{12}$ with or a mixture of Nb or Ta or a mixture of the two compounds; $Li_{7-x}La_3Zr_{2-x}M_xO_{12}$ with or a mixture of the two compounds; LiLipounds; Lin 1.9 and 2.1); d 9, and even lithiated phosphates, preferably chosen from: $Li_3PO_4$; $Li_3(Sc_{2-x}M_x)(PO_4)_3$ with M=Al or Y and 0≤x≤1; $Li_{1+x}M_x(Sc)_{2-x}(PO_4)_3$ with M=Al, Y, Ga or a mixture of the three compounds and 0≤x≤0.8; $Li_{1+x}M_x(Ga_{1-y}Sc_y)_{2-x}(PO_4)_3$ with 0≤x≤0.8; 0≤y≤1 and M=Al or Y or a mixture of the two compounds; $Li_{1+x}M_x(Ga)_{2-x}(PO_4)_3$ with M=Al, Y or a mixture of the two compounds and 0≤x≤0.8; $Li_{1+x}Al_xTi_{2-x}(PO_4)_3$ with 0≤x≤1, or $Li_{1+x}Al_xGe_{2-x}(PO_4)_3$ with 0≤x≤1; or $Li_{1+x+z}M_x(Ge_{1-y}Ti_y)_{2-x}Si_zP_{3-z}O_{12}$ with 0≤x≤0.8 and 0≤y≤1.0 and 0≤z≤0.6 and M=Al, Ga or Y or a mixture of two or three of said compounds; $Li_{3+y}(Sc_{2-x}M_x)Q_yP_{3-y}O_{12}$, with M=Al and/or Y and Q=Si and/or Se, 0≤x≤0.8 and 0≤y≤1; or $Li_{1+x+y}M_xSc_{2-x}Q_yP_{3-y}O_{12}$, with M=Al, Y, Ga or a mixture of the three compounds and Q=Si and/or Se, 0≤x≤0.8 and 0≤y≤1; or $Li_{1+x+y+z}M_x(Ga_{1-y}Sc_y)_{2-x}Q_zP_{3-z}O_{12}$ with 0≤x≤0.8; 0≤y≤1; 0≤z≤0.6 with M=Al or Y or a mixture of the two compounds and Q=Si and/or Se; or $Li_{1+x}N_xM_{2-x}P_3O_{12}$, with 0≤x≤1 and N=Cr and/or V, M=Sc, Sn, Zr, Hf, Se or Si, or a mixture of these compounds;

lithiated borates, preferably chosen from: $Li_3(Sc_{2-x}M_x)(BO_3)_3$ with M=Al or Y and 0≤x≤1; $Li_{1+x}M_x(Sc)_{2-x}(BO_3)_3$ with M=Al, Y, Ga or a mixture of the three compounds and 0≤x≤0.8; 0≤y≤1; $Li_{1+x}M_x(Ga_{1-y}Sc_y)_{2-x}(BO_3)_3$ with 0≤x≤0.8; 0≤y≤1 and M=Al or Y; $Li_{1+x}M_x(Ga)_{2-x}(BO_3)_3$ with M=Al, Y or a mixture of the two compounds and 0≤x≤0.8; 0≤y≤1; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

oxynitrides, preferably chosen from $Li_3PO_{4-x}N_{2x/3}$, $Li_4SiO_{4-x}N_{2x/3}$, $Li_4GeO_{4-x}N_{2x/3}$ with 0<x<4 or $Li_3BO_{3-x}N_{2x/3}$ with 0<x<3; the materials based on lithium, phosphorus or boron oxynitrides (called LiPON and LIBON) may also contain silicon, sulfur, zirconium, aluminum, or a combination of aluminum, boron, sulfur and/or silicon, and boron for lithium phosphorus;

lithiated oxides, preferably chosen from $Li_7La_3Zr_2O_{12}$ or $Li_{5+x}La_3(Zr_x,A_{2-x})O_{12}$ with A=Sc, Y, Al, Ga and 1.4≤x≤2 or $Li_{0.35}La_{0.55}TiO_3$;

silicates, preferably chosen from $Li_2Si_2O_5$, $Li_2SiO_3$, $Li_2Si_2O_6$, $LiAlSiO_4$, $Li_4SiO_4$, $LiAlSi_2O_6$.

The electrolyte material layer c) stable in contact with the anodes operating at reducing potentials is produced from electrolyte material chosen from garnets of formula $LidA1_xA2_y(TO_4)_z$ wherein:

A1 represents a cation of oxidation number +II, preferably Ca, Mg, Sr, Ba, Fe, Mn, Zn, Y, Gd; and wherein A2 represents a cation of oxidation number +III, preferably Al, Fe, Cr, Ga, Ti, La; and wherein $(TO_4)$ represents an anion in which T is an atom of oxidation number +IV, located at the center of a tetrahedron formed by oxygen atoms, and in which $TO_4$ advantageously represents the silicate or zirconate anion, with the understanding that all or some of the elements T with an oxidation number +IV may be replaced by atoms with an oxidation number +III or +V, such as Al, Fe, As, V, Nb, In, Ta;

with the understanding that: d is between 2 and 10, preferably between 3 and 9, and even more preferably between 4 and 8; x is 3 but may be between 2.6 and 3.4 (preferably between 2.8 and 3.2), and y is 2 but may be between 1.7 and 2.3 (preferably between 1.9 and 2.1);

the garnets, preferably chosen from: $Li_7La_3Zr_2O_{12}$; $Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with 0≤x≤1 and M=Nb or Ta or a mixture of the two compounds; $Li_{7-x}La_3Zr_{2-x}M_xO_{12}$ with 0≤x≤2 and M=Al, Ga or Ta or a mixture of two or three of said compounds;

lithiated phosphates, preferably chosen from: $Li_3PO_4$; $Li_3(Sc_{2-x}M_x)(PO_4)^3$ with M=Al or Y and 0≤x≤1;

$Li_{1+x}M_x(Sc)_{2-x}(PO_4)_3$ with M=Al, Y, Ga or a mixture of the three compounds and $0\leq x\leq 0.8$; $Li_{1+x}M_x(Ga_{1-y}Sc_y)_{2-x}(PO_4)_3$ with $0\leq x\leq 0.8$; $0\leq y\leq 1$ and M=Al or Y or a mixture of the two compounds; $Li_{1+x}M_x(Ga)_{2-x}(PO_4)_3$ with M=Al, Y or a mixture of the two compounds and $0\leq x\leq 0.8$; $Li_{1+x}Al_xGe_{2-x}(PO_4)_3$ with $0\leq x\leq 1$; $Li_{3+y}(Sc_{2-x}M_x)Q_yP_{3-y}O_{12}$, with M=Al and/or Y and Q=Si and/or Se, $0\leq x\leq 0.8$ and $0\leq y\leq 1$; or $Li_{1+x+y}M_xSc_{2-x}Q_yP_{3-y}O_{12}$, with M=Al, Y, Ga or a mixture of the three compounds and Q=Si and/or Se, $0\leq x\leq 0.8$ and with $0\leq y\leq 1$; or $Li_{1+x+y+z}M_x(Ga_{1-y}Sc_y)_{2-x}Q_zP_{3-z}O_{12}$ with $0\leq x\leq 0.8$; $0\leq y\leq 1$; $0\leq z\leq 0.6$ with M=Al or Y or a mixture of the two compounds and Q=Si and/or Se; or $Li_{1+x}N_xM_{2-x}P_3O_{12}$, with $0\leq x\leq 1$ and N=Cr and/or V, M=Sc, Sn, Zr, Hf, Se or Si, or a mixture of these compounds;

lithiated borates, preferably chosen from: $Li_3(Sc_{2-x}M_x)(BO_3)_3$ with M=Al or Y and $0\leq x\leq 1$; $Li_{1+x}M_x(Sc)_{2-x}(BO_3)_3$ with M=Al, Y, Ga or a mixture of the three compounds and with $0\leq x\leq 0.8$; $0\leq y\leq 1$; $Li_{1+x}M_x(Ga_{1-y}Sc_y)_{2-x}(BO_3)_3$ with $0\leq x\leq 0.8$; $0\leq y\leq 1$ and M=Al or Y; $Li_{1+x}M_x(Ga)_{2-x}(BO3)_3$ with M=Al, Y or a mixture of the two compounds and with $0\leq x\leq 0.8$; $0\leq y\leq 1$; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

oxynitrides, preferably chosen from $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; the materials based on lithium, phosphorus or boron oxynitrides (called LiPON and LIBON) may also contain silicon, sulfur, zirconium, aluminum, or a combination of aluminum, boron, sulfur and/or silicon, and boron for lithium phosphorus;

lithiated oxides, preferably chosen from $Li_7La_3Zr_2O_{12}$ or $Li_{5+x}La_3(Zr_x,A_{2-x})O_{12}$ with A=Sc, Y, Al, Ga and $1.4\leq x\leq 2$ or $Li_{0.35}La_{0.55}TiO_3$;

silicates, preferably chosen from $Li_2Si_2O_5$, $Li_2SiO_3$, $Li_2Si_2O_6$, $LiAlSiO_4$, $Li_4SiO_4$, $LiAlSi_2O_6$.

These electrolytes may be used with all anode chemical compositions.

Owing to the presence in the electrolyte of a cross-linked polymer material comprising ionic groups, it is possible to associated said electrolyte material layer c), stable in contact with anodes, with other solid electrolyte formulations that would be exclusively in contact with the cathodes. These electrolytes stable only in contact with the cathodes are perovskites of formulas $Li_{3x}La_{2/3-x}\square_{1/3-x}TiO_3$, $La_{2/3-x}Sr_{x\square 1/3-x}Li_xTi_{O3}$ and $La_{2/3}Li_{x\square 1/3-x}Ti_{1-x}Al_xO_3$ wherein $\square$ represents a vacancy present in the structure. Thus, for $Li_{3x}La_{2/3-x}\square_{1/3-x}TiO_3$, the composition includes a lanthanum vacancy in said composition capable of varying between 2/3-x and 1/3-x, with $0<x<0.20$ and preferably $0<x<0.16$; for $La_{2/3-x}Sr_{x\square 1/3-x}Li_xTiO_3$, the composition includes a strontium vacancy, the proportion of strontium in said composition being capable of varying between x and 1/3-x, with $0<x<0.20$ and preferably $0<x<0.16$; and for $La_{2/3}Li_{x\square 1/3-x}Ti_{1-x}Al_xO_3$, the composition includes a lithium vacancy, the proportion of lithium in said composition being capable of varying between x and 1/3-x, with $0<x<0.20$ and preferably $0<x<0.16$.

In addition, as these solid electrolytes are more resistive than liquid electrolytes based on aprotic solvents containing lithium salts, it is necessary to produce thin films in order to have sufficiently powerful batteries. Thus, the thickness of the electrolyte layer c) is less than 10 μm, preferably less than 5 μm and even more preferably less than 2 μm.

In an embodiment of the process according to the invention, the solid cross-linked polymer material comprising ionic groups is deposited directly by dip-coating, spin-coating, roll coating, doctor blade, electrospraying or electrophoresis. For this, the polymer material is first dissolved in an appropriate solvent, the polymer material dissolved on the anode, cathode and/or electrolyte layer(s) is deposited, then the polymer material layer is dried before the solvent is removed.

Advantageously, the deposition of the solid cross-linked polymer material is performed by electrophoresis in order to limit the defects in the layer that may cause short circuits in the final battery. In addition, the electrophoretic deposition makes it possible to reduce the risk of cracking of the layer after drying, unlike the layers produced by inks or fluids, having low dry extracts and for which the deposits contain large amounts of solvent, which, after drying, leads to the appearance of cracks in the deposit, which is detrimental to the operation of a battery.

In another embodiment of the process according to the invention, a monomer and/or an oligomer and/or a pre-polymer including one or more polymerizable groups is deposited. Preferably, a pre-polymer including one or more reactive groups is deposited, enabling the grafting of ionic groups. The polymerization is performed thermally and/or photochemically directly on the anode, cathode or electrolyte layer(s). Typically, the polymerization is performed in the presence of a thermal initiator, for example chosen from benzoyl peroxide, acetyl peroxide or azoisobutyronitrile, and/or a photochemical initiator, for example chosen from benzoin, an acetophenone, such as 2,2-dimethoxy-2-phenylacetophenone or 2,2-diethoxyacetophenone.

The deposition of a solid cross-linked polymer material comprising ionic groups makes it possible to considerably increase the ionic conductivity of the electrolyte. In addition, these materials are relatively non-flammable, resistant to high temperature, and have a negligible vapor pressure. The cross-linked polymer layer comprising ionic groups thus makes it possible to produce a thin-layer three-dimensional battery without using a heat treatment and/or extreme mechanical compression during the step of assembly of said battery.

In fact, the production of at least one layer of solid cross-linked polymer material comprising ionic groups makes it possible to assemble electrodes at low temperature, i.e. a temperature not exceeding 300° C., preferably 200° C. and even more preferably 150° C.

Advantageously, an ionic liquid, PYR 13, PYR 14 and/or a lithium salt may be dissolved in said cross-linked polymers comprising ionic groups. The addition of an ionic liquid, PYR 13, PYR 14 and/or a lithium salt is beneficial for electrochemical performance, and this addition makes it possible to improve conduction but also makes it possible to reduce the rigidity of the polymer film, which, without this addition, remains highly breakable.

According to a particular embodiment of the process of the invention, the electrodes (anode and cathode) are "punched" according to a cutting pattern in order to produce cuts with the dimensions of the battery to be produced.

In a particular embodiment, the punching of the electrodes may be performed after step c) of deposition of the electrolyte layer made of a solid cross-linked polymer material comprising ionic groups. These patterns include three cuts that are adjoined (for example in a U shape), and which define the dimension of the battery. A second slot may be produced on the non-cut side in order to make it possible to ensure that products necessary for encapsulation of the component can pass. The anode and cathode electrodes are then stacked alternately in order to form a stack of a plurality of basic cells. The anode and cathode cutting patterns are placed in a "head-to-tail" configuration.

In another particular embodiment of the process according to the invention, the electrodes are cut before step c) of deposition of the electrolyte layer(s), enabling the electrode edges to be covered by an electrolyte film, thus protecting the electrodes from contact with the atmosphere, and enabling the lifetime of the battery to be improved. In an alternative embodiment, the cuts are produced on the substrates before steps a) and b) of deposition of the anode and cathode layer, enabling the electrode edges to be covered by an electrolyte film. This particular embodiment has the advantage of covering the electrode edges before the layer of electrolyte material nanoparticles is deposited, thereby enabling an encapsulation film to be easily produced around the electrodes, in particular when the electrolyte layer is comprised of moisture-stable materials. The covering of the lateral edges of the electrodes also makes it possible to reduce the risks of short circuit in the cell.

Finally, an essential step of the process according to the invention includes a heat treatment and/or mechanical compression of the stack obtained above in order to obtain an all-solid thin-layer battery. The heat treatment is performed at a temperature of between 50 and 300° C., preferably 100 and 200° C. Advantageously, the temperature of the heat treatment does not exceed 200° C. Advantageously, the mechanical compression of the layers to be assembled is performed at a pressure of between 10 and 100 MPa, and preferably between 20 and 50 MPa.

In a particular embodiment, it is advantageous, after the step of stacking and before the addition of terminals, to encapsulate the stack by depositing a thin encapsulation layer in order to ensure the protection of the battery cell from the atmosphere. The encapsulation layer must be chemically stable, resist high temperatures and be impermeable to the atmosphere in order to perform its function as barrier layer. Preferably, the thin encapsulation layer consists of a polymer, a ceramic, a glass or a vitroceramic, capable of being, for example, in oxide, nitride, phosphate, oxynitride or siloxane form. Even more preferably, this encapsulation layer is coated with an epoxy or silicone resin.

The encapsulation layer may advantageously be deposited by chemical vapor deposition (CVD), which makes it possible to provide coverage of all the accessible stack surfaces. Thus, the encapsulation may be performed directly on the stacks, the coating being capable of penetrating all of the available cavities. Advantageously, a second encapsulation layer may be deposited on the first encapsulation layer in order to increase the protection of the battery cells from the external environment. Typically, the deposition of said second layer may be performed by silicone impregnation. The choice of such a material is based on the fact that it is resistant to high temperatures and the battery may thus be easily assembled by welding on electronic cards without the appearance of glass transitions.

Advantageously, the encapsulation of the battery is performed on four of the six faces of the stack. The encapsulation layers surround the periphery of the stack, with the remainder of the protection from the atmosphere being ensured by the layers obtained by the terminals.

Preferably, the cathode and anode connections are laterally offset, enabling the encapsulation layer to operate as a dielectric layer in order to prevent the presence of a short circuit at these ends.

Once the stack has been produced, and after the step of encapsulation of the stack if it is performed, terminals (electrical contacts) are added where the cathode or anode current collectors, respectively, are exposed (not coated with encapsulation layers). These contact zones may be on opposite sides of the stack in order to collect the current, but also on adjacent sides.

To produce the terminals, the stack, optionally coated, is cut according to cutting planes making it possible to obtain unitary battery components, with exposure on each of the cutting planes of connections (+) and (−) of the battery. The connections may then be metallized by means of plasma deposition techniques known to a person skilled in the art and/or by immersion in a conductive epoxy resin (filled with silver) and/or a molten tin bath. The terminals make it possible to establish alternately positive and negative electrical connections on each of the ends. These terminals make it possible to produce the electrical connections in parallel between the different battery elements. For this, only the (+) connections emerge at one end, and the (−) connections are available at the other ends.

As this battery is all-solid, and uses a lithium insertion material as the anode material, the risks of formation of metallic lithium dendrites during the recharging steps are zero and the capacity for insertion of the lithium anode becomes limited.

In addition, to ensure good cycling performance of the battery according to the invention, the battery architecture for which the surface capacity of the cathodes is greater than or equal to the surface capacity of the anodes is preferred.

As the layers forming the battery are all-solid, the risk of formation of lithium dendrites no longer exists when the anode is fully charged. Thus, such a battery architecture avoids the creation of an excess of battery cells.

In addition, the production of such a battery with cathode surface capacities greater than or equal to those of the anodes makes it possible to increase performance in terms of lifetime, expressed as a number of cycles. In fact, as the electrodes are dense and all-solid, the risk of loss of electrical contact between the particles is zero.

EXAMPLE

A suspension of the anode material was obtained by grinding then dispersion of $Li_4Ti_5O_{12}$ in 10 g/l of absolute ethanol with several ppm of citric acid.

A suspension of the cathode material was obtained by grinding/dispersion of $LiMn_2O_4$ in 25 g/l of absolute ethanol. The cathode suspension was then diluted in acetone to a concentration of 5 g/l.

The suspension of the ceramic electrolyte material was obtained by grinding/dispersion of a powder of $Li_3Al_{0.4}Sc_{1.6}(PO_4)_3$ in 5 g/l of absolute ethanol and an addition of a polymer formulation. The polymer formulation added consisted of polyethylene glycol monomethylacrylate with an ionic liquid 1-butyl-3-methylimidazolium tetrafluoroborate [BMIm][BF4] (in a mass proportion of around 3:7) and a lithium salt (lithium (lithium bis(trifluoromethansulfonyl) imide or LiTFSI). A photoinitiator (around 1% by mass), in this case 2,2'dimethoxy-2-phenylacetophenone (Irgacure™ 651, Ciba-Geigy) was added to the polymer formulation.

For all of these suspensions, the grindings were performed so as to obtain stable suspensions with particle sizes smaller than 100 nm.

The negative electrodes were prepared by electrophoretic deposition of the $Li_4Ti_5O_{12}$ nanoparticles contained in the suspension previously prepared. The thin film of $Li_4Ti_5O_{12}$ (around 1 micron) was deposited on the two faces of the substrate. These negative electrodes were then heat-treated at 600° C.

The positive electrodes were prepared in the same way, by electrophoretic deposition from the LiMn$_2$O$_4$ suspension. The thin film of LiMn$_2$O$_4$ (around 1 µm) was deposited on the two faces of the substrate. The positive electrodes were then treated at 600° C.

After the heat treatment, the negative electrodes and the positive electrodes were covered by dip-coating (dipping followed by drying) of an electrolyte layer consisting of Li$_3$Al$_{0.4}$Sc$_{1.6}$(PO$_4$)$_3$ and the aforementioned polymer formulation.

The cross-linking was obtained by irradiation at 366 nm for 10 minutes at ambient temperature, in an argon atmosphere.

The thickness of the electrolyte layer was measured and is around 500 nm on each electrode. These electrolyte films were then dried and consolidated by heat treatment.

The stack of anodes and cathodes was then produced in order to obtain a multilayer stack. The assembly was kept under pressure for 15 minutes at 100° C. in order to produce the assembly.

Figure 1:
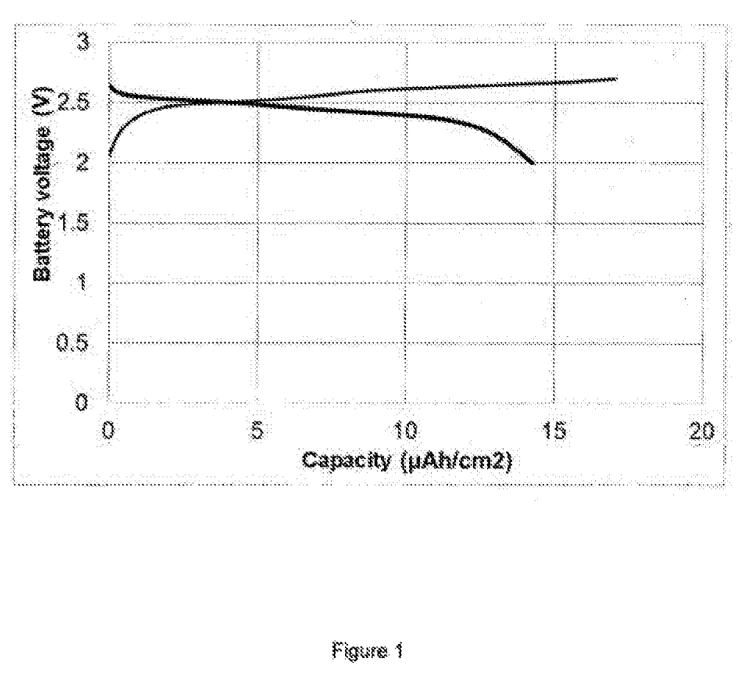
FIG. 1 shows the charge and discharge curves obtained with an all-solid, thin-layer battery.
Figure 2:
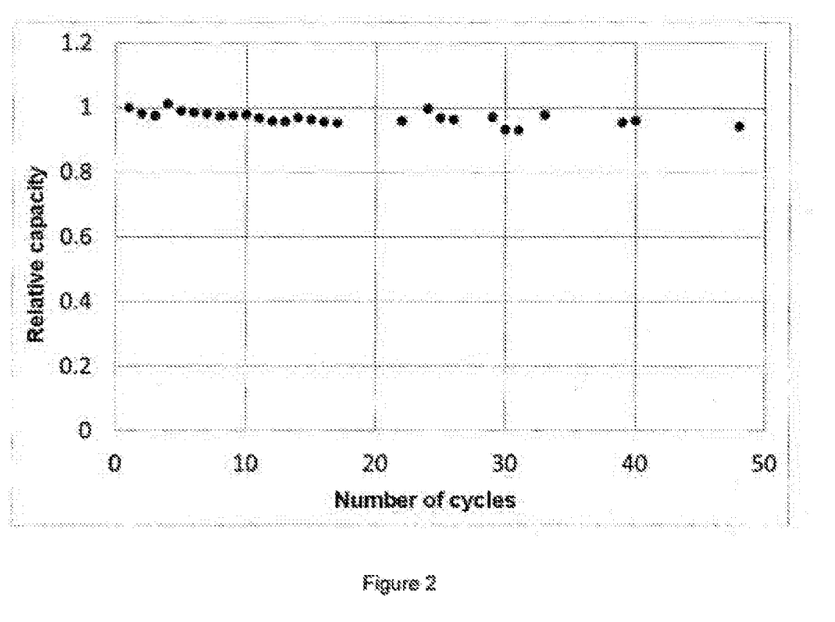
FIG. 2 shows the change in capacity of the all-solid, thin-layer battery thus produced during cycling.

The battery thus obtained was cycled between 2 V and 2.7 V. FIG. 1 shows the charge and discharge curves obtained with this battery. FIG. 2 shows the change in capacity of the battery thus produced during cycling.

What is claimed is:

1. A process for producing an all-solid, thin-layer battery, the process comprising:
   a) depositing an anode material layer including at least one anode material on a first conductive substrate formed by a metal sheet, a metal strip, a metallized insulating sheet, a metallized insulating strip, or a metallized insulating film, said first conductive substrate, or conductive elements thereof, configured to serve as an anode current collector;
   b) depositing a cathode material layer including at least one cathode material on a second conductive substrate formed by a metal sheet, a metal strip, a metallized insulating sheet, a metallized insulating strip, or a metallized insulating film, said second conductive substrate, or conductive elements thereof, configured to serve as a cathode current collector;
   c) depositing, on at least one of the at least one anode material layer and the at least one cathode material layer, an electrolyte material layer including at least one solid electrolyte material having a thickness of less than 10 µm, the at least one solid electrolyte material layer including a solid electrolyte and a solid cross-linked polymer material comprising ionic groups, wherein the cross-linked polymer material is obtained by: polymerizing a mixture of monomers, and/or oligomers, and/or pre-polymers including one or more thermally polymerizable groups or photochemically polymerizable groups, said mixture of monomers, and/or oligomers, and/or pre-polymers including one or more reactive groups enabling said ionic groups to be grafted, and then, after the polymerizing, drying the cross-linked polymer material obtained, wherein the thermal polymerization and/or photochemical polymerization is performed directly on the at least one anode material layer and/or the at least one cathode material layer;
   d) stacking, in a face-to-face arrangement:
      the at least one anode material layer coated with the at least one solid electrolyte material layer obtained in c), with the at least one cathode material layer either uncoated or coated with the at least one solid electrolyte material layer obtained in c), or
      the at least one cathode material layer coated with the at least one solid electrolyte material layer obtained in c), with the at least one anode material layer either uncoated or coated with the at least one solid electrolyte material layer obtained in c);
   e) performing a heat treatment at a temperature of between 50 and 300° C. on the stack obtained in d) to obtain the all-solid, thin-layer battery.

2. The process of claim 1, wherein the cross-linked polymer material is chosen from polymethyl methacrylates, polyamines, polyimides, or polysiloxanes.

3. The process of claim 1, wherein the ionic groups of the polymer material are chosen from the following cations: imidazolium, pyrazolium, tetrazolium, pyridinium, pyrrolidinium, including n-propyl-n-methylpyrrolidinium (also called PYR$_{13}$) or n-butyl-n-methylpyrrolidinium (also called PYR$_{14}$), ammonium, phosphonium or sulfonium; and/or from the following anions: bis(trifluoromethane)sulfonimide, bis(fluorosulfonyl)imide, or n-(nonafluorobutane-sulfonyl)-n-(trifluoromethanesulfonyl)-imide.

4. The process of claim 1, wherein the at least one anode material layer and/or the at least one cathode material layer include graphite, and/or lithium ion conductive materials, of the type used to produce the at least one solid electrolyte material layer.

5. The process of claim 1, wherein:
   depositing the anode material layer comprises depositing nanoparticles of the at least one anode material using electrophoresis; and
   depositing the cathode material layer comprises depositing nanoparticles of the at least one cathode material using electrophoresis.

6. The process of claim 1, wherein the at least one anode material layer is produced from a material chosen from:
   (i) tin oxynitrides (typical formula SnO$_x$N$_y$);
   (ii) lithiated iron phosphate (typical formula LiFePO$_4$);
   (iii) mixed silicon and tin oxynitrides formed as SiSn$_{0.87}$O$_{1.2}$N$_{1.72}$, as well as oxynitrides with the typical form Si$_a$Sn$_b$C$_c$O$_y$N$_z$ with a>0, b>0, a+b≤2, 0<c<10, 0<y<24, 0<z<17; Si$_a$Sn$_b$C$_c$O$_y$N$_z$X$_n$ with X$_n$ at least one of the elements among F, Cl, Br, I, S, Se, Te, P, As, Sb, Bi, Ge, Pb and a>0, b>0, a+b>0, a+b≤2, 0<c<10, 0<y<24 and 0<z<17; and Si$_a$Sn$_b$O$_y$N$_z$X$_n$ with X$_n$ at least one of the elements among F, Cl, Br, I, S, Se, Te, P, As, Sb, Bi, Ge, Pb and a>0, b>0, a+b≤2, 0<y≤4 and 0<z≤3;
   (iv) nitrides of type Si$_x$N$_y$ (in particular with x=3 and y=4), Sn$_x$N$_y$ (with x=3 and y=4), Zn$_x$N$_y$ (with x=3 and y=4), Li$_{3-x}$M$_x$N (with M=Co, Ni, Cu);
   (v) oxides SnO$_2$, Li$_4$Ti$_5$O$_{12}$, SnB$_{0.6}$P$_{0.4}$O$_{2.9}$ and TiO$_2$.

7. The process of claim 1, wherein the at least one cathode material layer is produced from a material chosen from:
   (i) oxides LiMn$_2$O$_4$, LiCoO$_2$, LiNiO$_2$, LiMn$_{1.5}$Ni$_{0.5}$O$_4$, LiMn$_{1.5}$Ni$_{0.5-x}$X$_x$O$_4$ (in which X is selected from Al, Fe, Cr, Co, Rh, Nd, other rare earth elements, and in which 0<x<0.1), LiFeO$_2$, LiMn$_{1/3}$Ni$_{1/3}$Co$_{1/3}$O$_4$;
   (ii) phosphates LiFePO$_4$, LiMnPO$_4$, LiCoPO$_4$, LiNiPO$_4$, Li$_3$V$_2$(PO$_4$)$_3$; the phosphates of formula LiMM'PO$_4$, with M and M' (M≠M') selected from Fe, Mn, Ni, Co, V; and
   (iii) all lithiated forms of the following chalcogenides: V$_2$O$_5$, V$_3$O$_8$, TiS$_2$, titanium oxysulfides (TiO$_y$S$_z$), tungsten oxysulfides (WO$_y$S$_z$), CuS, CuS$_2$.

8. The process of claim 1, further comprising, after e):
f) encapsulating the all-solid, thin-layer battery by depositing at least one layer of a ceramic material, a vitreous material, or a vitroceramic material.

9. The process of claim 1, further comprising producing an anode terminal and a cathode terminal by deposition of a tin layer.

10. An all-solid, thin-layer battery, produced in accordance with the process of claim 1.

11. The all-solid, thin-layer battery of claim 10, wherein a surface capacity of the solid cathode is greater than or equal to a surface capacity of the solid anode.

12. The all-solid, thin-layer battery of claim 10, wherein a stack of the solid cathode is laterally offset to a stack of the solid anode.

13. The all-solid, thin-layer battery of claim 10, further comprising at least one first encapsulation layer composed of a ceramic material, a glass material, or a vitroceramic material.

14. The all-solid, thin-layer battery of claim 13, further comprising a second encapsulation layer on the at least one first encapsulation layer, the second encapsulation layer being composed of silicone.

15. The all-solid, thin-layer battery of claim 13, wherein said at least one first encapsulation layer entirely covers four of six faces of said all-solid, thin-film battery, and partially covers two remaining faces located below metallizations for connection of the all-solid, thin-layer battery.

16. The all-solid, thin-layer battery of claim 10, further comprising terminals where, respectively, the cathode current collectors and the anode current collector is exposed.

17. The all-solid, thin-layer battery of claim 10, further comprising anode connections and cathode connections respectively located on opposite sides of the stack.

* * * * *